United States Patent [19]

Yasushi

[11] Patent Number: 5,495,880

[45] Date of Patent: *Mar. 5, 1996

[54] MULTIPLE TIRES ON A SINGLE WHEEL

[76] Inventor: Ozaki Yasushi, 25-16, Tokumaru 7-chome, Itabashi-ku, Tokyo, Japan

[*] Notice: The term of this patent shall not extend beyond the expiration date of Pat. No. 5,244,026.

[21] Appl. No.: 309,747

[22] Filed: Sep. 21, 1994

Related U.S. Application Data

[63] Continuation-in-part of Ser. No. 120,289, Sep. 13, 1993, abandoned, which is a continuation of Ser. No. 788,202, Nov. 5, 1991, Pat. No. 5,244,026.

[30] Foreign Application Priority Data

Jun. 18, 1991 [JP] Japan .................. 3-174303

[51] Int. Cl.$^6$ .................... B60C 23/02; B60C 29/00
[52] U.S. Cl. .............. 152/415; 137/493.9; 152/450
[58] Field of Search .................. 152/415, 450; 137/493.9

[56] References Cited

U.S. PATENT DOCUMENTS

| | | | |
|---|---|---|---|
| 1,134,701 | 4/1915 | Seeberger | 152/415 |
| 1,335,711 | 3/1920 | Takovleff | 152/415 |
| 2,463,335 | 3/1949 | Warnshuis et al. | 152/415 |
| 3,760,859 | 9/1973 | Shahan et al. | 152/415 |
| 4,033,375 | 7/1977 | Hirsch | 137/493.9 |
| 4,562,861 | 1/1986 | Payton | 137/493.9 |
| 5,048,561 | 9/1991 | Taplin | 137/493.9 |

FOREIGN PATENT DOCUMENTS

0814148  5/1959  United Kingdom .............. 152/427

*Primary Examiner*—Michael W. Ball
*Assistant Examiner*—Francis J. Lorin
*Attorney, Agent, or Firm*—Christopher R. Pastel; Thomas R. Morrison

[57] ABSTRACT

Multiple tires are mounted adjacently parallel to each other on a single wheel. Respective inner spaces of the multiple tires communicate with each other by way of an airflow pipe for the transfer of air. The airflow pipe includes a pneumatic pressure control valve that opens or closes in response to air leaking from one or more of the multiple tires. When one of the multiple tires leaks air rapidly, the pneumatic pressure of the other normal tire decreases, thereby forcing the driver to notice the puncture. If one tire leaks air slowly, its air is replenished from another tire. Thus the respective pneumatic pressures of the individual tires become equal, whereby the driver can continue to drive for a time without risking the serious accident that could occur if he were unaware of the leak.

10 Claims, 11 Drawing Sheets

MULTIPLE TIRES ON A SINGLE WHEEL

This application is a continuation-in-part of application Ser. No. 08/120,289 filed Sep. 13, 1993, now abandoned, which was in turn a continuation of Ser. No. 07/788,202 filed Nov. 5, 1991, and issued as U.S. Pat. No. 5,244,026 on Sep. 14, 1993.

BACKGROUND OF THE INVENTION

1. Field of the Invention

This invention relates to multiple tires mounted parallel to each other on an outer periphery of a single wheel. These multiple tires have superior safety and operability. This invention relates particularly to multiple tires that communicate with each other through an airflow pipe inserted into an internal space of each tire. Further, the airflow pipe comprises a pneumatic pressure control valve that is effective, either open or closed, in responding to an air leak in the multiple tires.

2. Description of the Prior Art

Figure 12:
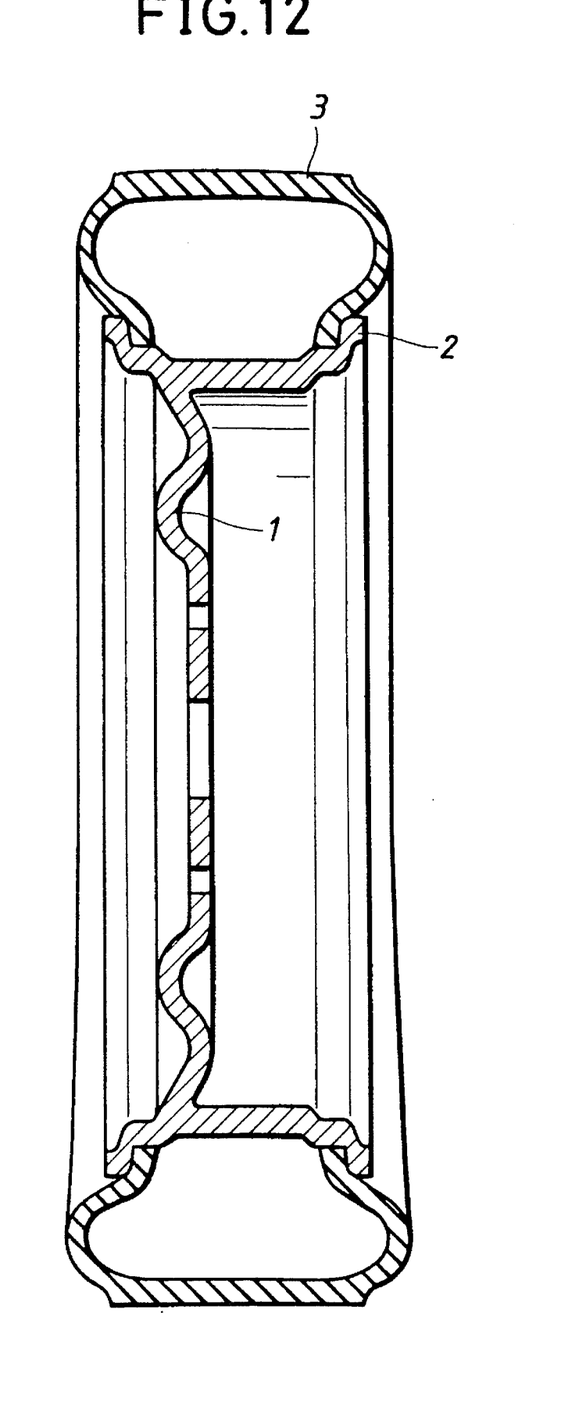
FIG. 12 is a sectional view of a general single tire.
Figure 13:
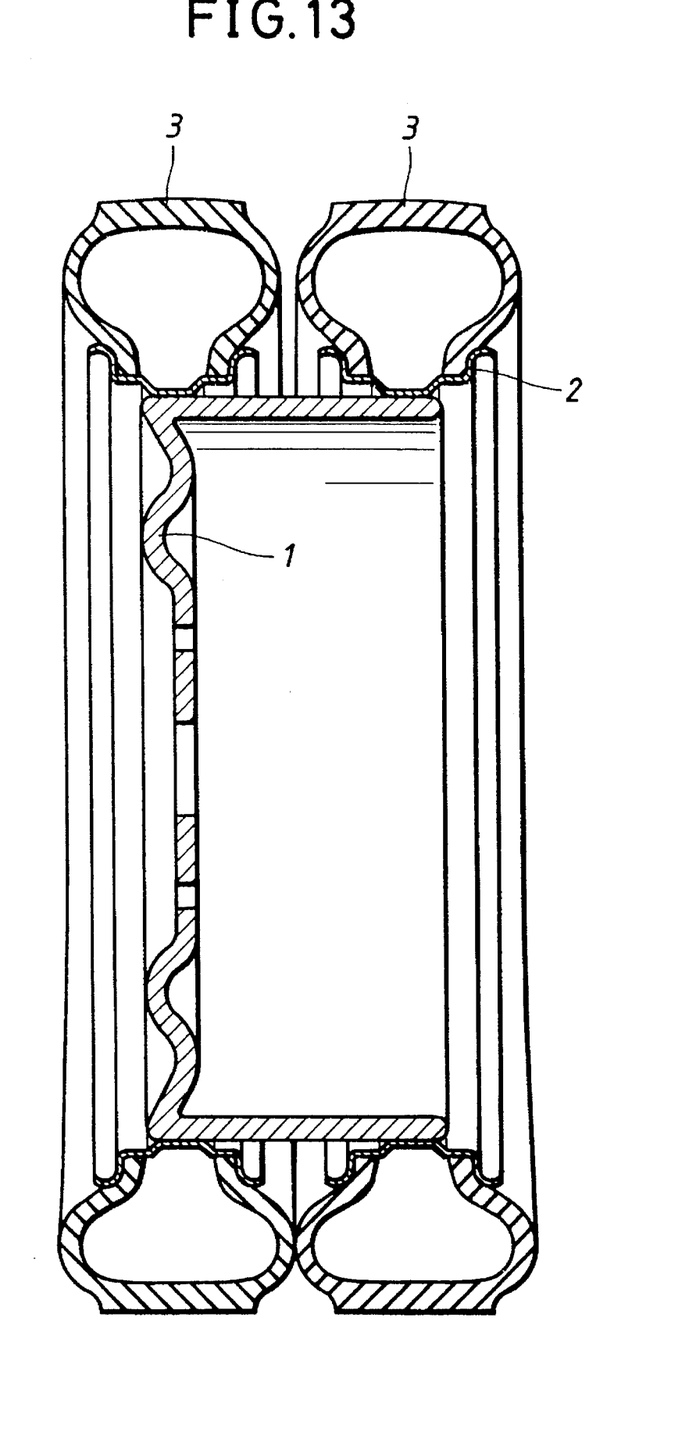
FIG. 13 is a sectional view of conventional multiple tires.

FIG. 12 shows a sectional view of a single pneumatic tire 3 for a vehicle. Tire 3 is mounted on a rim 2 of a wheel 1. FIG. 13 shows a section view of two tires 3, 3 mounted parallel to each other on two rims 2a, 2b of single wheel 1. This technique is disclosed in Japanese Laid-open Patent Publication No. 60-12303. It was developed specifically for a sports car to overcome the disadvantages of a single tire having a larger width. The two tires have good water repelling properties, more area to contact the ground, less vibration, and more stability when driven. In addition, even if one tire blows out, the driver can drive the car on the other normal tire without coming to a stop.

However, when one tire leaks air gradually, the driver drives on without becoming aware of the leak. In particular, when the car travels in a straight line, it drives almost normally. Moreover, if an inner tire leaks air, it is very hard to detect from the outside. However, when one of the tires is leaking air and the car goes around a curve at a high speed, a serious accident can occur, because the car's center of gravity is disturbed by the leaking tire. Though multiple tires have certain advantages, they are not widely used because of these safety considerations.

In U.S. Pat. No. 1,134,701 issued to Seeburger, a valve is incorporated in a wheel to allow air from one tire to flow into the other tire. The valve is normally open to allow air to pass from one tire to the other freely, thereby equalizing pressure between the two tires. The valve has a frictionally restrained closure device that closes if the pressure difference between the two tires reaches a specified level. If one of the tires develops a small leak, air from one tire can flow into the other. However, if the leak is such that the specified pressure difference develops, the valve closes and the sound tire is isolated from the leaking tire.

The Seeburger device suffers from the following limitations. The frictional engagement of the valve closure device does not permit the valve to reopen when the pressures are approximately equalized. Thus, if the leaking tire is repaired, for example, by an emergency flat-fixing product, the valve will remain closed until a high pressure is applied to the once-leaking tire. This restorative pressure must be substantially greater than that in the sound tire. In fact, this restorative pressure would have to be as great as the specified pressure that caused the valve to close in the first place, and the excess pressure would have to be applied for a precise time interval to prevent the valve from overshooting and closing on the opposite side. In addition, the large pressure required to shift the valve closure to the neutral position could result in unsafe pressure conditions in the once-leaking tire. Such a large pressure may be impossible to achieve under certain circumstances, for example, in an emergency.

The Seeburger arrangement allows pressure between the two tires to equalize when the pressure differences are smaller than a certain pressure difference and to close once, when the pressure differences are greater than the certain pressure difference. Thus the Seeburger device is, for all practical purposes, a one-shot device for protection against blowouts in one tire. It also has the disadvantage that, should a small leak develop in one tire, both the leaky tire and the sound tire could lose all their air and become completely flat. Seeburger's apparatus therefore cannot solve the problem solved by the present invention of quickly alerting a driver to a leak and letting him drive on safely.

Another inter-tire valve arrangement is shown by Cardi in U.S. Pat. No. 2,789,617. The Cardi valve is actually two valves, one for each tire, each of which opens to the other tire when the pressure in the respective tire is above a fixed level. The air presses against a spring which allows air to flow out of the tire and into a common space. As long as the pressure in either tire is above the fixed level, the corresponding valve will remain open to pass air to the other tire until equilibrium is reached. Both valves remain open as long as both tires are at or above the fixed pressure level. Should a leak cause pressure in one tire to drop below the fixed level, the other tire will feed the leaky tire until the pressure in the sound tire reaches the fixed level. Thereafter, the valve of the sound tire will close and the sound tire will remain indefinitely at the fixed pressure level.

The Cardi valve is able to prevent a sound tire from becoming flat. However, when a rapid loss of pressure occurs in one tire, such as in a blowout, the Cardi valve permits a rapid loss of pressure from the sound tire. This sudden change of pressure can be dangerous, since the loss of pressure causes a sudden change in the vehicle's handling characteristics. In addition, when both tires are inflated above the fixed pressure level, air passes between the tires because of minute transient pressure differences between them. Such minute transient pressure differences occur when the vehicle hits bumps, swerves, or turns. The pumping of air between tires through the valve, which restricts the flow of air, is also a source of energy loss that increases fuel consumption.

For the above reasons, Cardi's apparatus cannot solve the problem solved by the present invention of safely alerting a driver to a leak and letting him drive on. Moreover, Cardi's device introduces certain undesirable parasitic energy losses.

OBJECTS AND SUMMARY OF THE INVENTION

It is an object of this invention to provide multiple tires on a single wheel that allow the driver to become aware readily of an air leak in a tire, thereby enabling safe driving on a leaking tire, albeit at a slow speed.

To achieve this object, the present inventor has studied how the driver may be alerted to an air leak, particularly in an inner one of the multiple tires. The principal advantage of multiple tires is that, when one of them is punctured, the driver can drive his car on the other, normal tire. The present invention connects the inner spaces of the multiple tires to each other by an airflow pipe. When one tire leaks air, the pneumatic pressure of the other tire is decreased as air flows from the former to the latter. The driver can then easily notice the puncture. When one tire leaks air slowly, it is supplied air from the other, normal tire, thereby equalizing the pneumatic pressure in both tires. With the tires at equal pressure, the driver can drive slowly and is thus not immobilized as with a flat tire. Since the airflow pipe has a pneumatic pressure control valve, which can be opened or closed when air leaks from one of the multiple tires, the present invention enjoys considerable advantages and conveniences.

The present invention overcomes the deficiencies of the prior-art devices by employing a special valve design. The valve of the present invention is closed when pressure differences are lower than a first level or greater than a second level and open when pressure differences are between the first and second levels. These characteristics are achieved in a compact and lightweight design that is easily and cheaply manufactured.

The above, and other objects, features, and advantages of this invention will become apparent from the following description read in conjunction with the accompanying drawings.

DETAILED DESCRIPTION OF THE PREFERRED EMBODIMENTS

Figure 1:
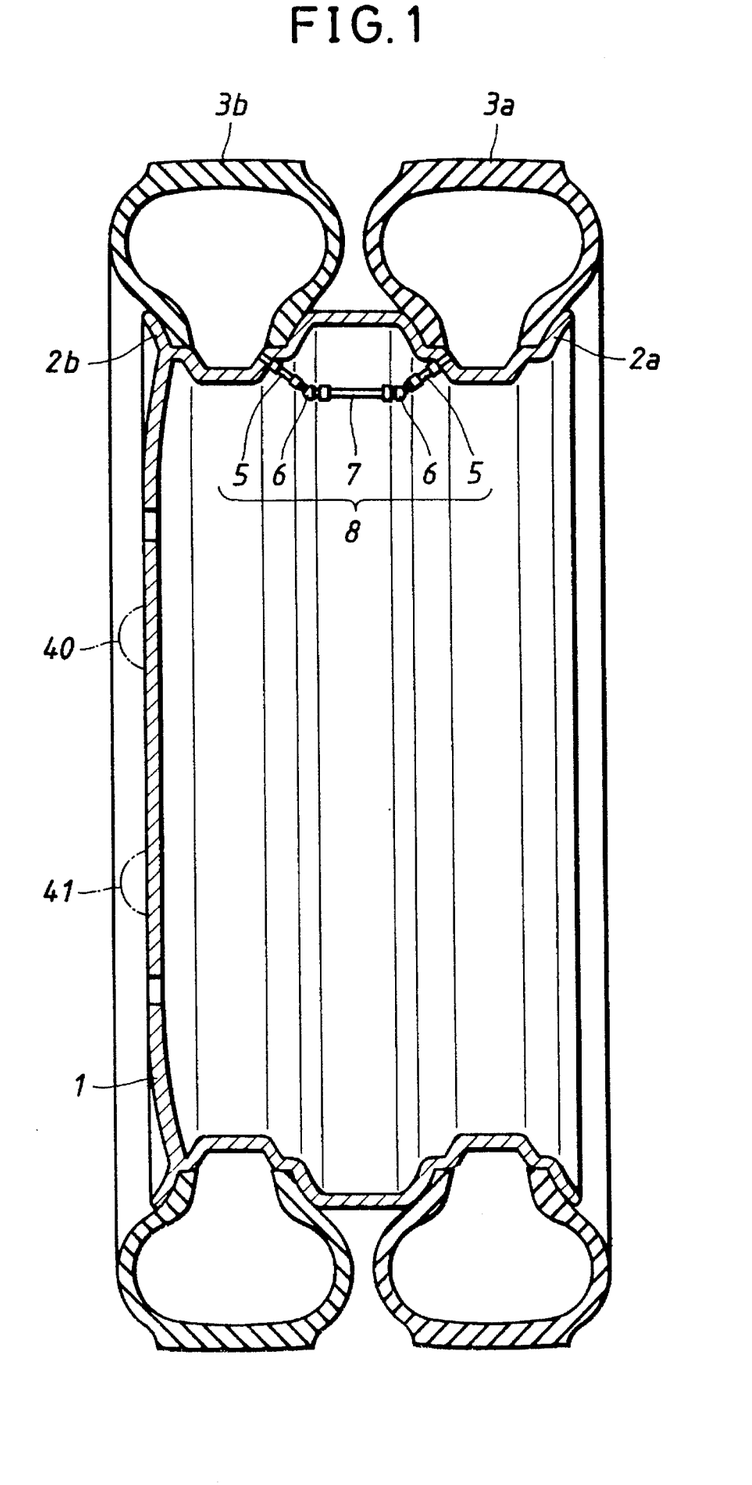
FIG. 1 is a sectional view of an embodiment of multiple tires according to this invention.

Referring to FIG. 1, a first rim 2a and a second rim 2b are integrally formed in a parallel configuration on an outer periphery of a single wheel 1. Two tires, a first tire 3a and a second tire 3b, are disposed respectively on first rim 2a and second rim 2b. A bent airflow pipe 8 is connected between respective inner spaces of first and second tires 3a, 3b. Pipe 8 comprises two separate connectors 5, 5 at both sides, two separate joints 6, 6 there adjacent, and a pneumatic pressure control valve 7 between joints 6, 6.

Figure 2:
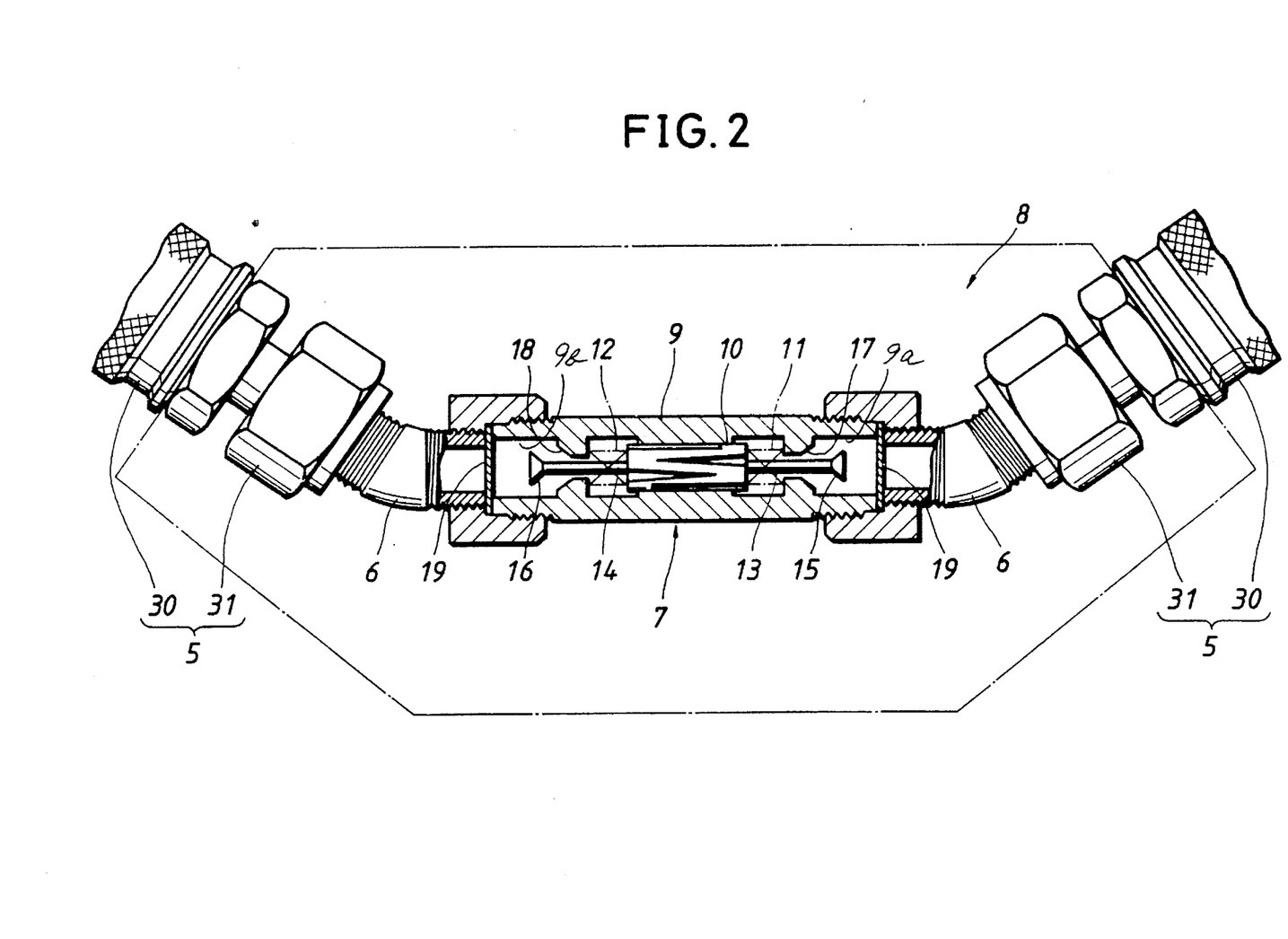
FIG. 2 is an enlarged sectional view of a pneumatic pressure valve in the embodiment of FIG. 1.

Referring to FIG. 2, pneumatic pressure control valve 7 comprises a cylindrical housing 9, a cylindrical valve body 10 slidable axially in an internal space of housing 9, a pair of springs 11, 12 for pressing in valve body 10 equally from left and right directions. A pair of elongated bars 13, 14 with respective flanges 15, 16 are extended from both left and right sides of valve body 10. Flanges 15, 16 can be engaged with a pair of protrusions 17, 18 that protrude from an inner wall of housing 9. A pair of filters 19, 19 are disposed between both ends of housing 9 and of joints 6, 6 to prevent any dust from multiple tires 3a, 3b from penetrating into the internal space of housing 9.

Figure 3:
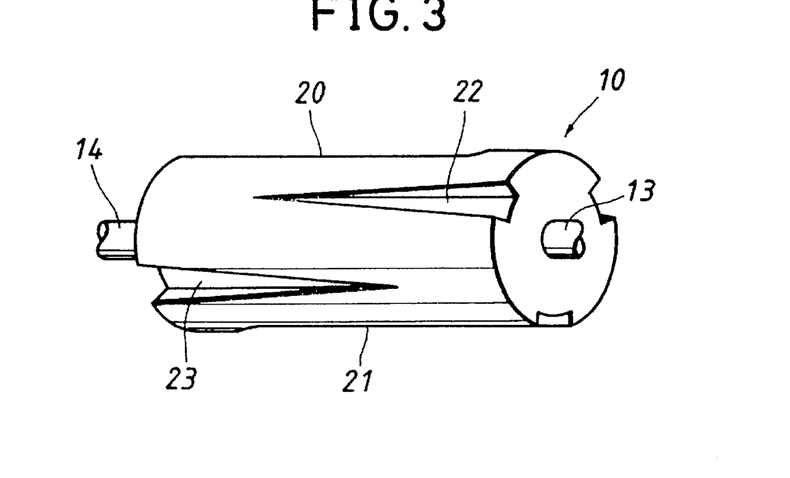
FIG. 3 is a perspective view of the body of the pneumatic pressure control valve.

Referring to FIG. 3, valve body 10, incorporated in pneumatic pressure control valve 7, includes four tapered grooves 20, 21, 22, 23 extending axially on a surface of valve body 10. Two more grooves (not illustrated) are disposed on a back surface of valve body 10. Upper groove 20 extends from a left end of valve body 10 without reaching a right end thereof. Lower groove 21 extends from the right end of valve body 10 without reaching the left end thereof. Groove 22 is formed in the same way as groove 21, but groove 22 becomes narrower and shallower in a leftward direction. Groove 23 is formed in the same way as groove 20, but groove 23 becomes narrower and shallower in a rightward direction.

The functioning of pneumatic pressure control valve 7 will now be described. When neither first tire 3a nor second tire 3b leaks air, the pneumatic pressure of both tires is the same. Accordingly, valve body 10, pressed equally from left and right, is positioned in the center of housing 9, as shown in FIG. 2. Under these conditions, the six grooves, including grooves 20 to 23 on the surface of valve body 10, do not extend to spaces 9a, 9b in housing 9. Thus grooves 20 to 23 block the passage of air between tires 3a and 3b.

Figure 4:
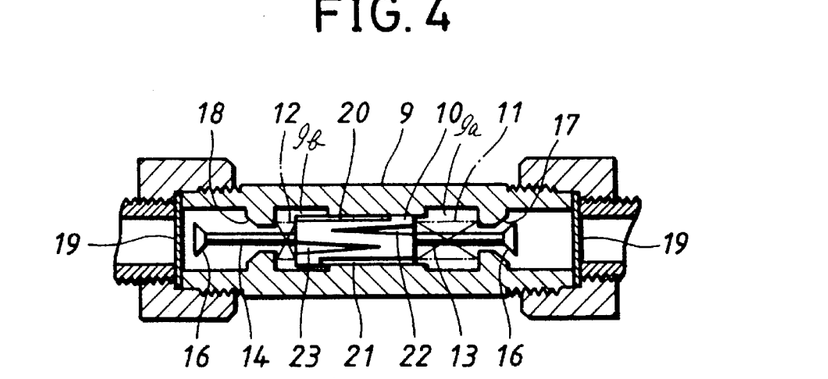
FIGS. 4 and 5 are respectively sectional views that show the pneumatic pressure control valve in operation.

If air begins to leak slowly from tire 3b, the pneumatic pressure of leaking tire 3b becomes lower than that of normal tire 3a. If the pressure of normal tire 3a exceeds that of leaky tire 3b by a first pressure level, valve body 10 is pressed a sufficient distance from right to left, as shown in FIG. 4, to force grooves 21, 22, and an additional groove on the back side of valve body 10, into communication with left side space 9b. This causes air to flow gradually from tire 3a into tire 3b, and both tires 3a, 3b lose air pressure. The lower pressure in both tires shows the driver that there has been a puncture. When the pressure loss from sound tire 3a reaches the first pressure level, the pressure difference is no longer sufficient to keep the valve open. When this happens, valve body 10 retracts to a more central position. Grooves 21, 22, and the additional groove on the back side of valve body 10 are no longer in communication with left-side space 9b.

Figure 5:
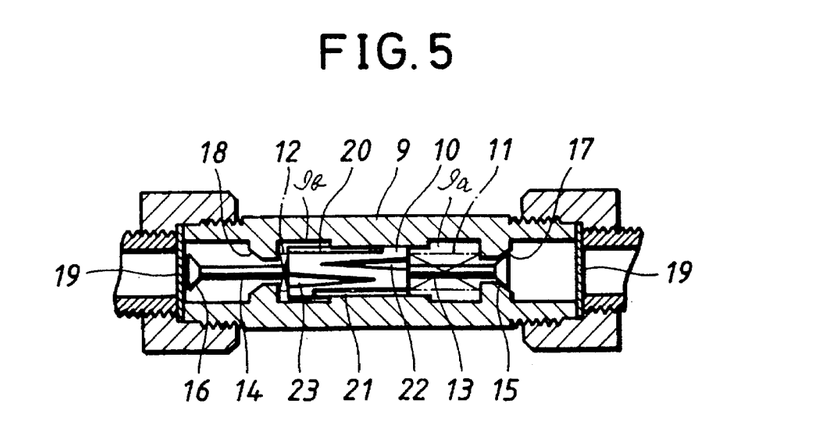

When tire 3b is punctured severely, causing it to lose air pressure rapidly, the difference between the respective pressures of tires 3a, 3b becomes very large. If this pressure difference exceeds a second pressure level, valve body 10 moves substantially to the left, as shown in FIG. 5. In this case, flange 16 of right elongated bar 14 engages with protrusion 17, thereby sealing space 9a. The sudden loss of pressure from normal tire 3a causes the driver to notice the puncture. Since, however, little air leaks from tire 3a, driving can continue safely.

The values of the first and second pressure levels defined above are chosen according to the vehicle on which the tires are to be mounted. The first pressure level would be a minimal safe pressure for operating the vehicle at a low speed on a single tire. The second pressure level would be near to the normal operating pressure of the tires.

Figure 6:
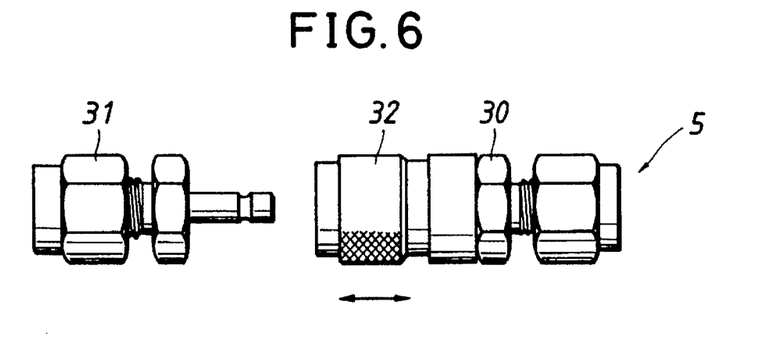
FIG. 6 is a view of a connector disposed in the pneumatic control valve.

Referring to FIG. 6, connector 5 comprises two separate members: a main member 30 and an additional member 31. They connect both sides of pneumatic pressure control valve 7 to the interior of respective tires 3a, 3b. Members 30, 31 can be connected to or disconnected from each other by sliding a sleeve 32 fixed to main member 31, as shown by an arrow in FIG. 6. Accordingly, airflow pipe 8, as shown in FIG. 2, can be removed by a simple finger manipulation of sleeve 32. When airflow pipe 8 is removed, the passage through main member 30 is closed, so tire 3a and tire 3b become independent of each other. If the driver becomes aware of the puncture by noticing the reduction of the pneumatic pressure in tires 3a, 3b, he can stop the car immediately and remove airflow pipe 8 by separating connectors 5, 5. Thus it is possible to prevent normal tire 3a from leaking more air until punctured tire 3b is replaced or repaired.

Figure 7:
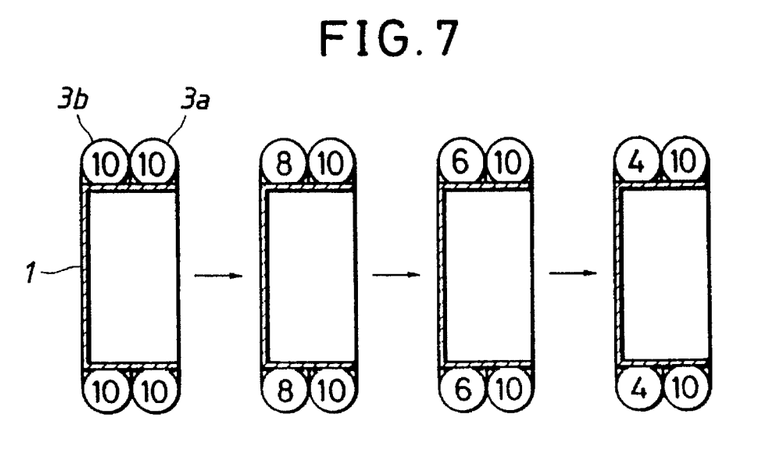
FIG. 7 is a schematic chart showing an air pressure decrease when one of the conventional multiple tires is punctured.

According to this invention, air flows between tires 3a, 3b at a predetermined rate as described below. For example, assume that each of tires 3a, 3b is fully filled with air at the rate of 10 kg-f/cm². If tire 3b is punctured, it leaks air at the rate of 2 kg-f/cm² per hour. If tires 3a, 3b are conventional multiple tires with no connection between them through which air flows, as shown in the schematic air flow chart of FIG. 7, air leaks from tire 3b at the rate of 2 kg-f/cm² per hour. Tire 3a is normal and thus not affected at all by the leak in tire 3b. Thus the driver can continue to drive without becoming aware of the puncture of tire 3b. However, if the driver goes around a curve at high speed, a serious accident can occur.

Figure 8:
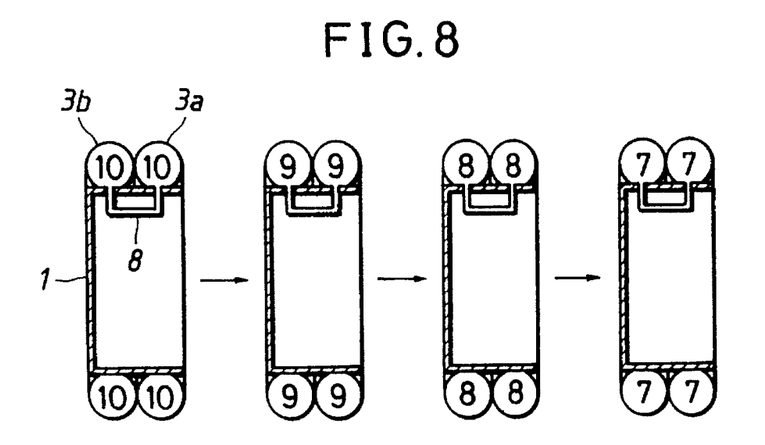
FIG. 8 is a schematic chart showing an air pressure decrease when the multiple tires of this invention are punctured.

To reduce the likelihood of such an accident, airflow pipe 8 enables air communication between tires 3a, 3b. As soon as tire 3b is punctured, air from normal tire 3a flows into punctured tire 3b, thereby lowering the air pressure in both tires 3a, 3b at substantially the same rate, as shown in FIG. 8. That is, the pressure is equalized between the two tires. The driver can drive safely, even though the tire pressure is below normal, by maintaining a low speed.

It is difficult for the driver to notice which tire was punctured. Further, when replacing punctured tire 3b with a new tire, tire 3a must also be fully refilled with air.

Figure 9:
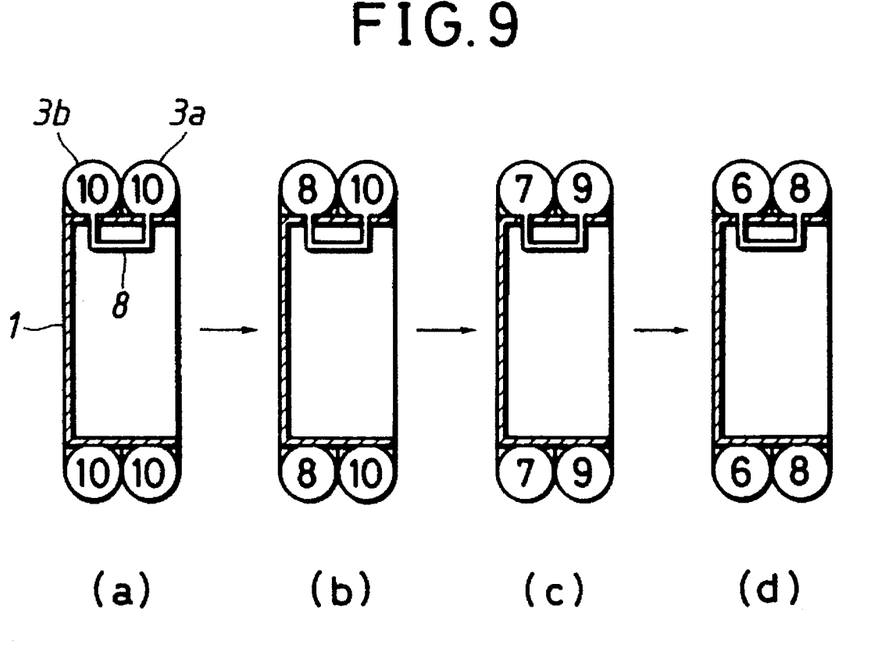
FIG. 9 is a schematic chart showing an air pressure decrease when the multiple tires of this invention are punctured.

To overcome this problem, the leakage of air from tire 3a is regulated by pneumatic pressure control valve 7 to remain at a safe level that may be less than that from punctured tire 3b, so that the former loses air pressure more slowly than the latter. FIG. 9 shows a schematic chart of such a gradual air leakage. As shown in FIG. 9, the pressure in normal tire 3a permits the driver to drive the car for a relatively longer time. In this case, tire 3a loses air pressure gradually, so the driver becomes aware of the puncture well before the vehicle becomes difficult to handle and therefore in danger of an accident.

To achieve the gradual air leakage shown in FIG. 9, the rate of air flow between tires 3a, 3b is preferably preset to be from 0.01 to 12 liters per minute. It may be adjusted by varying the respective diameters of connectors 5, 5; joints 6, 6; and pneumatic pressure control valve 7; and the respective shapes or depths of grooves 20 to 23.

Alternate ones of grooves 21, 23, on the surface of valve body 10, are narrower and shallower in opposite axial directions. The larger the difference between the respective pneumatic pressures of the two tires, the less the restriction to the flow of air between them. It should be noted, however, that it is not necessary for pneumatic pressure control valve 7 to open further when the pressure difference between tires 3a, 3b increases.

To notify the driver which of tires 3a, 3b has been punctured, two different colored lamps 40, 41, shown in FIG. 1 by dash-and-dot lines, may be placed on the outer side of wheel 1. For example, when tire 3b is punctured or springs a leak, first lamp 40 (for example, of a red color) lights. When tire 3a is punctured, second lamp 41 (for example, of a green color) lights, so that the punctured tire can be identified easily by the driver. Lamps 40, 41 can be switched on by switching means disposed in valve body 10 of pneumatic pressure control valve 7.

Figure 10:
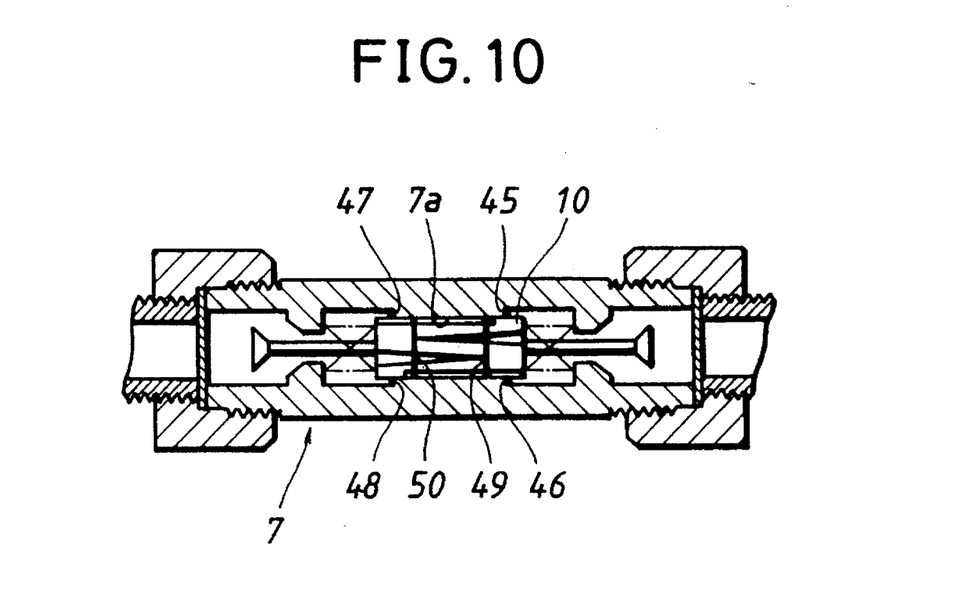
FIG. 10 is a sectional view of a further embodiment of the pneumatic pressure control valve.
Figure 11:
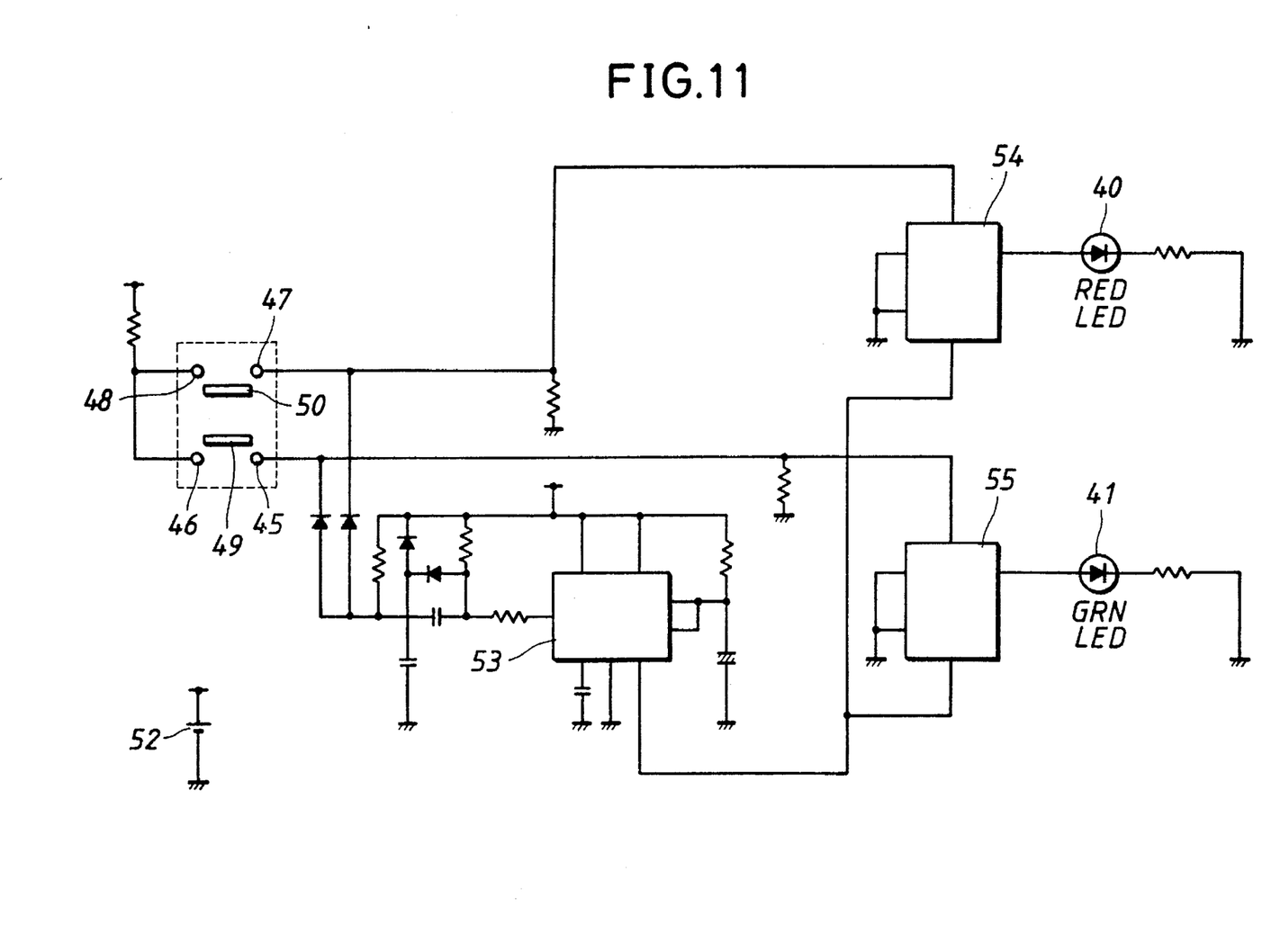
FIG. 11 is an electric circuit for the foregoing embodiment.

More specifically, referring to FIG. 10, a plurality of terminals 45–48 are disposed on both sides of an inner periphery 7a of pneumatic pressure control valve 7. Valve body 10 is slidable on inner periphery 7a. Two electrically conductive annular members 49, 50 are disposed on the surface of valve body 10. Both pneumatic pressure control valve 7 and valve body 10 must be made of a non-conductive material such as resin or the like. When a difference between the respective pneumatic pressures of tires 3a, 3b arises, valve body 10 is moved left or right, engaging terminals 45, 46 with conductive member 49 or engaging terminals 47, 48 with conductive member 50. A light-emitting diode of either lamp 40 or lamp 41, disposed in a circuit in FIG. 1, is switched on. After that, even though the position of valve body 10 is changed, either one of the lamps stays ON. Referring to FIG. 11, a battery 52, a timer semiconductor 53, and semiconductors 54, 55 maintain the lamp in a lit condition after it has been turned on.

It is of course to be understood that this invention is not limited to two tires disposed on a single wheel. The invention may be applied to three or more tires to attain the same object and functions.

As discussed above, when one of two or more tires loses air rapidly, as from a puncture, the pneumatic pressure of another tire is also decreased because air leaks from the punctured tire. Therefore the present invention will work similarly in any car having any combination of multiple tires.

When one of two or more tires slowly leaks air, it is supplied air from another, normal tire, thereby equalizing the pneumatic pressure of the respective tires. Thus driving at slow speed is possible despite the leak. The driver is therefore entirely free from any serious accident that could occur if he does not become aware of the puncture. The driver also avoids becoming immobilized. Further, the multiple tires allow the driver to enjoy stable driving and good water repelling properties. Still further, since pneumatic pressure control valve 7 is opened or closed in response to an air leak, the multiple tires are protected.

Figure 14:
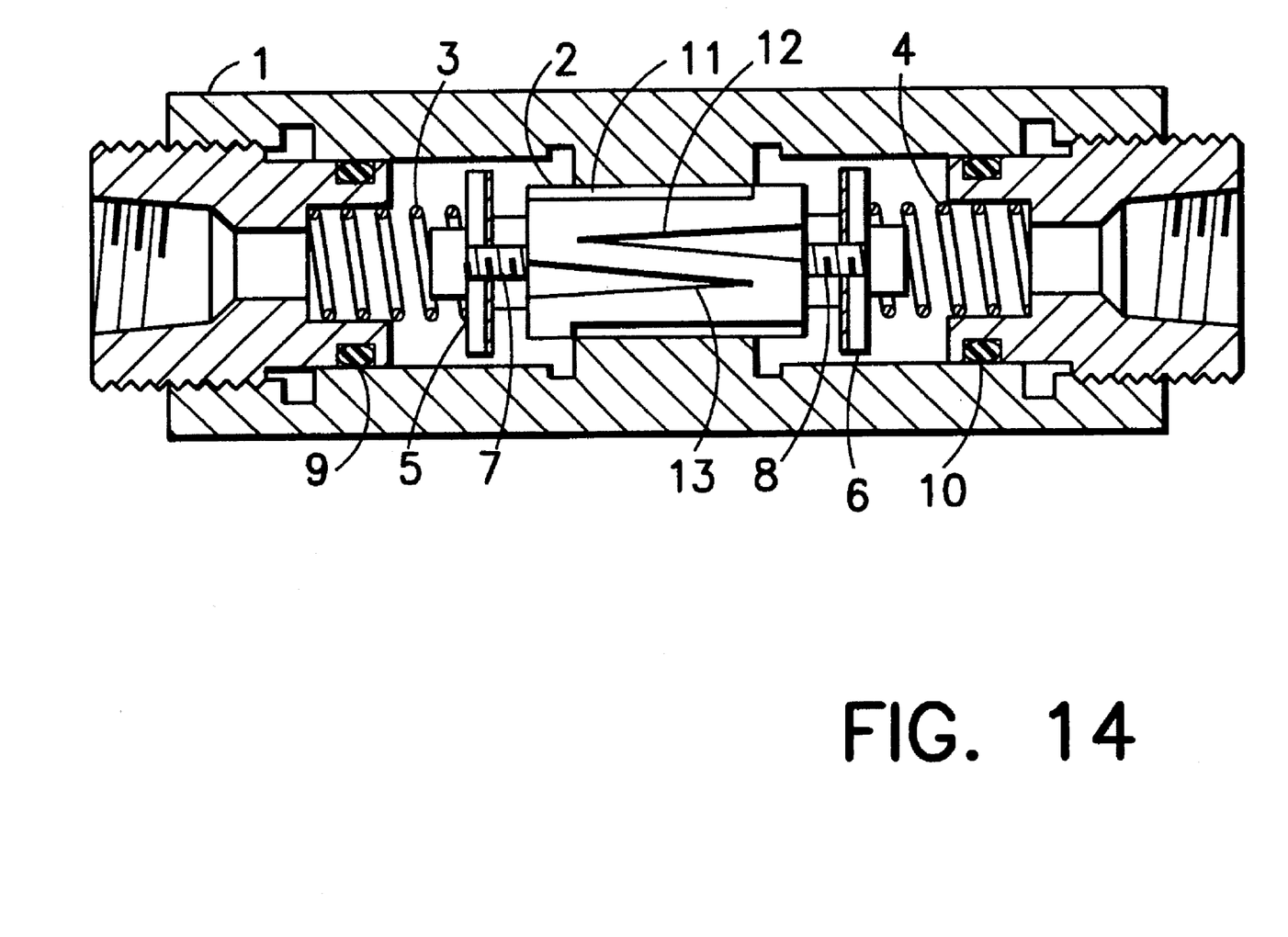
FIG. 14 is a plan view of one embodiment of the pneumatic pressure control valve component of the present invention.

Referring to FIG. 14, in another embodiment of the present invention, the ends of elongated bars 7, 8 are sealed against flanges 5, 6 when a high pressure difference occurs. The design includes cylindrical housing and a valve body 2 with tapered grooves 11, 12, and 13. The sealing of the valve to tubes connected to the two tires is accomplished by means of packing 9, 10.

Tests were conducted on an embodiment of pneumatic pressure control valve 7 to demonstrate a valve that under normal conditions maintains equal pressure for both tires, and that, if the pressure in one of the tires drops because of a puncture or the like, supplies air from the high-pressure side to the low-pressure side within the set pressure difference, and does this until an equilibrium is reached.

Figure 15:
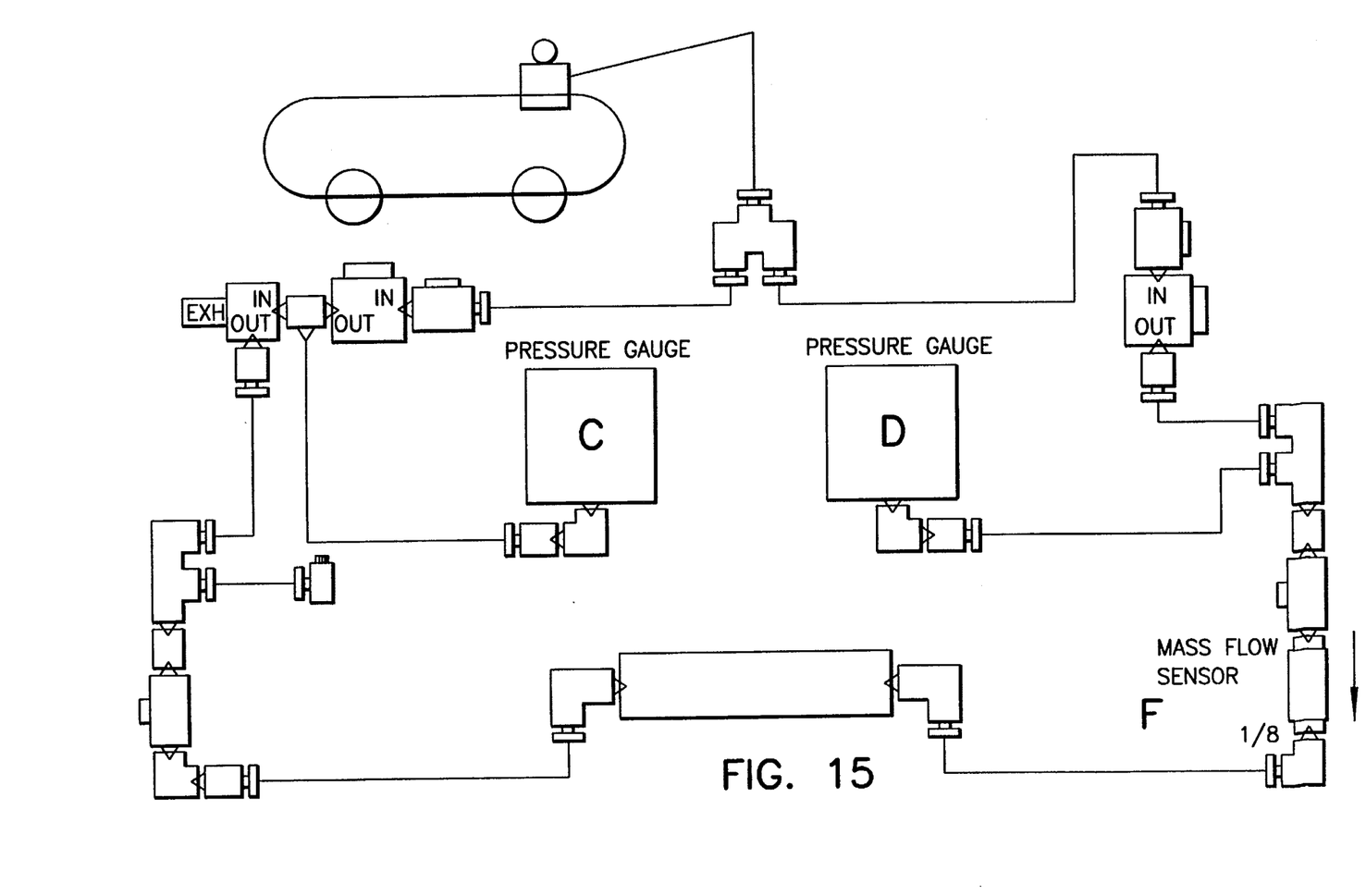
FIG. 15 is a diagram of the arrangement of tubes in the apparatus for testing the operation of the pneumatic pressure control valve component of the present invention.
Figure 16:
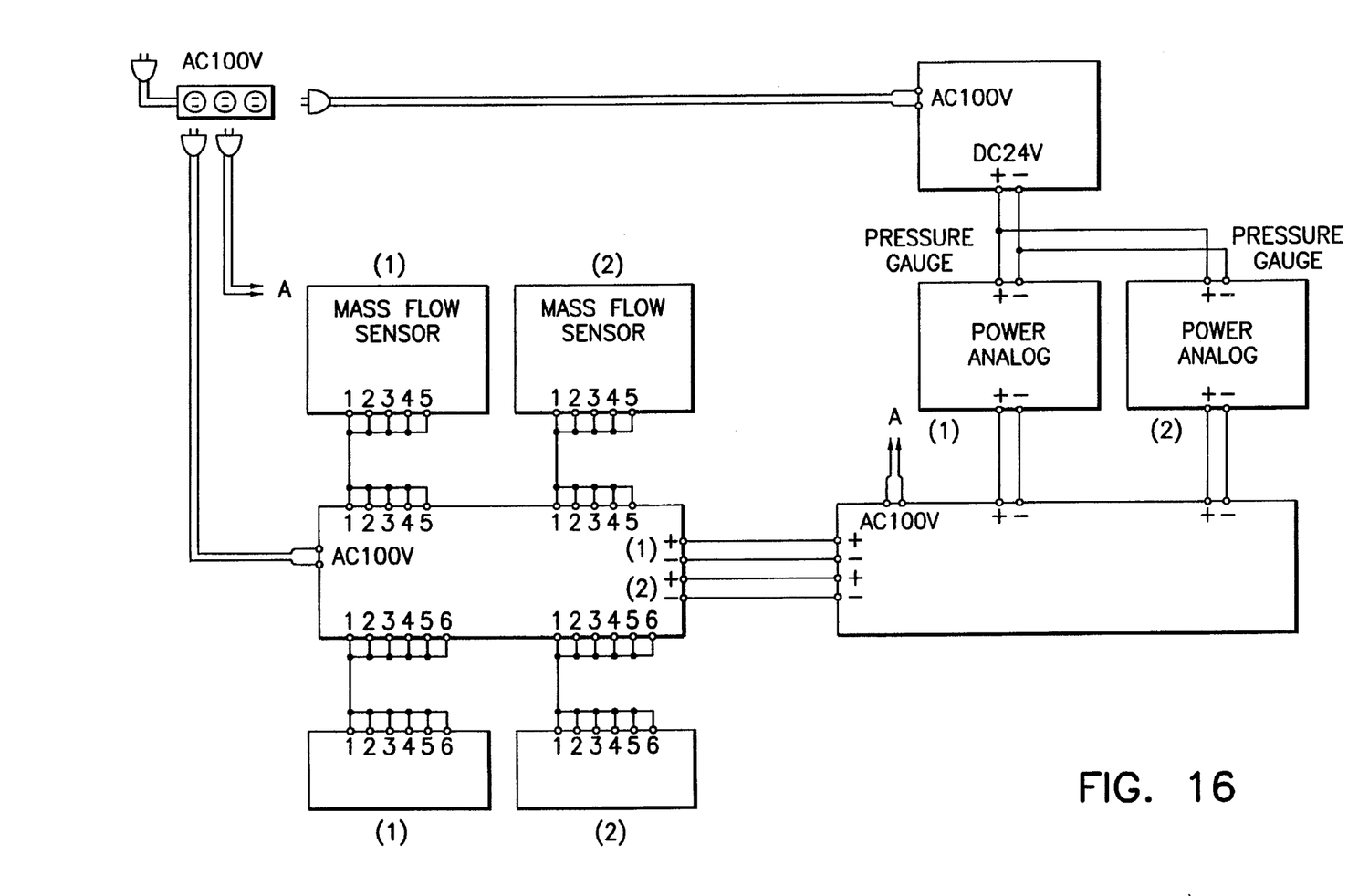
FIG. 16 is a schematic of the electronics of the apparatus for testing the pneumatic pressure control valve component of the present invention.

Referring to FIGS. 15 and 16, since the test was conducted to determine whether air flow could open and close the valve as described above, compressors instead of tires supplied air. The pressure test equipment was as follows:

Pressure gauge: (an integrated model as shown) GC72–173 (Nagano Instruments Mfg. Ltd.). Pressure range: 0–3 kgf/cm². Output: 1–5 V. C shows the pressure for a flat tire; D, for a normal tire.

Mass flow meter: Model 3810 (Kojima Mfg. Co. Ltd.). Since mass flow meters measure mass rather than volume, the measurements are not affected by temperature or density. The results are displayed as amount of flow for one minute at 20 degrees C. and one atmosphere. Range 1 SLM (1/min). Output 0–1 V. F shows the flow amount from the normal tire.

Referring to FIG. 16, the electronic equipment of the test was as follows:

Pen recorder: (4–pen) LR4100 series 3711–43–1 (Yokogawa). Pen colors: red—flat tire pressure, green—normal tire pressure, brown—flow from normal tire.

To determine the rate of leakage in the overall device, the test valve unit was mounted, the valve above the regulator (HV8-02-2) was closed, the device was put in a closed system, and, after leaving it at 2 kgf/cm², pressure changes were observed.

After leaving the device for one hour under the conditions described above, there was a pressure drop of 0.08 kgf/cm². This amount would not affect measurements in this test so it can be ignored.

Referring to FIG. 14, the structure of the pneumatic pressure control valve in the tested embodiment is as follows:

1. The pressure difference between the left and right chambers moves the sliding valve, causing air to flow through the gap. When the pressure difference reaches the set value, the valve closes and air flow stops.
2. A spacer adjusts the open/close stroke of the sliding valve. The stroke settings in this test are 12.4, 14.4, 16.4 cm.
3. An orifice is arranged on the sliding valve so that air moves from the high-pressure side to the low-pressure side when the amount of valve displacement is 2.5 mm (this value was based on the measurement results from test A).

The method of carrying out the test was as follows:

A) 1. Using the test device described above, air was sent to the pneumatic pressure control valve with equal pressure from left and right. The valve above the regulator on the flat-tire side was closed.
2. To simulate a flat tire, the air pressure at the flat-tire side was decreased. While the pressure dropped, the movement of the sliding valve and the air flow on the normal-tire side were studied.

B) 1. Using the same test device, air was sent to the pneumatic pressure control valve with equal pressure from left and right. Pressure was adjusted with the regulator on the flat-tire side, and the relationship between the displacement of the sliding valve (the one with the orifice) and the air flow was studied.

Results of tests A and B were as follows:

Test A) Measuring the air pressure difference between the flat tire and the normal tire when the sliding valve is closed and air flow stopped.

| Trial 1: Stroke 16.4 mm. Pressure difference (kgf/cm²) | |
|---|---|
| 1.28 | |
| 1.15 | |
| 1.18 | |
| 1.12 | |
| 1.26 | |
| 1.15 | |
| 1.09 | |
| 1.10 | |
| 1.10 | |
| 1.09 | |
| 1.10 | |
| 1.09 | |
| 1.09 | Average 1.14 kgf/cm² |

| Trial 2: Stroke 14.4 mm. Pressure difference (kgf/cm²) | |
|---|---|
| 1.0 | |
| 0.94 | |
| 0.94 | |
| 0.94 | |
| 0.94 | |
| 0.92 | |
| 0.94 | |
| 0.95 | |
| 0.94 | Average 0.95 kgf/cm² |

| Trial 3: Stroke 12.4 mm. Pressure difference (kgf/cm²) | |
|---|---|
| 0.89 | |
| 0.89 | |
| 0.87 | Average 0.88 kgf/cm² |

The data above indicate that the pressure when the sliding valve closes and flow is blocked can be set by adjusting the stroke of the sliding valve.

It should also be noted that, since the precision of the sliding surface was not very good, there was always some continuity in the air inside the cylinders during the time between the start of the test and the closing of the cylinder (pressure difference 0 kgf/cm²–0.9 kgf/cm²).

Test B) The displacement of the sliding valve and the amount of air flowing from the normal-tire side when a pressure difference is created. (In trials I–V, I–IV show the results when there is no orifice; V, when an orifice is present. The orifice is set to operate when valve displacement is 2.5 mm).

| | Trial I | |
|---|---|---|
| Pressure difference kgf/cm² | Valve displacement mm | Air Flow slm |
| 0 | 0 | 0.07 |
| 0.1 | 0.5 | 0.49 |
| 0.2 | 0.5 | 2.07 |
| 0.3 | 1.5 | 5.73 |
| 0.4 | 2.0 | 7.70 |
| 0.5 | — | — |
| 0.6 | 3.5 | 10.34 |
| 0.7 | 4.0 | 11.62 |
| 0.8 | 5.0 | 13.19 |
| 0.85 | 5.5 | 13.78 |
| 0.9 | 6.0 | 14.34 |

| Trial II | | |
|---|---|---|
| Pressure difference kgf/cm² | Valve displacement mm | Air Flow slm |
| 0 | 0 | 0.39 |
| 0.1 | 0.5 | 0.53 |
| 0.2 | 0.5 | 2.13 |
| 0.3 | 1.5 | 5.52 |
| 0.4 | 2.0 | 7.55 |
| 0.5 | 2.5 | 8.84 |
| 0.6 | 3.5 | 10.25 |
| 0.7 | — | — |
| 0.8 | 5.0 | 13.13 |
| 0.85 | — | — |
| 0.9 | 6.0 | 14.00 |

| Trial III | | |
|---|---|---|
| Pressure difference kgf/cm² | Valve displacement mm | Air Flow slm |
| 0 | 0 | 0.01 |
| 0.1 | 0.75 | 1.19 |
| 0.2 | 0.75 | 0.77 |
| 0.3 | 1.25 | 2.46 |
| 0.4 | 2.0 | 5.28 |
| 0.5 | 3.0 | 7.47 |
| 0.6 | 4.0 | 9.28 |
| 0.7 | 4.5 | 10.59 |
| 0.8 | 5.5 | 11.99 |
| 0.85 | — | — |
| 0.9 | — | — |

| Trial IV | | |
|---|---|---|
| Pressure difference kgf/cm² | Valve displacement mm | Air Flow slm |
| 0 | 0 | — |
| 0.1 | 0.25 | 0.44 |
| 0.2 | 0.5 | 1.23 |
| 0.3 | 1.0 | 3.05 |
| 0.4 | 1.75 | 5.70 |
| 0.5 | 3.0 | 7.91 |
| 0.6 | 3.5 | 9.44 |
| 0.7 | 4.5 | 10.8 |
| 0.8 | 5.0 | 12.01 |
| 0.85 | — | — |
| 0.92 | — | 6.55 |

| Trial V | | |
|---|---|---|
| Pressure difference kgf/cm² | Valve displacement mm | Air Flow slm |
| 0 | 0 | 0.01 |
| 0.1 | 0.5 | 0.31 |
| 0.2 | 0.75 | 0.83 |
| 0.3 | 1.0 | 3.15 |
| 0.4 | 1.5 | 7.65 |
| 0.5 | 2.5 | 19.31 |
| 0.6 | 2.75 | OVERFLOW |
| 0.7 | 3.5 | OVERFLOW |
| 0.8 | 4.25 | OVERFLOW |
| 0.85 | 5.0 | OVERFLOW |
| 0.9 | 5.25 | OVERFLOW |

These results indicate that the amount of air flowing in changes when an orifice is arranged on the sliding valve. Therefore, it is also clear that, by setting the valve orifice and the position, it is possible to set the amount of air flow and the point at which the sliding of the valve begins.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A combination of multiple tires comprising:

a first and a second tire disposed adjacently parallel to each other on a single wheel;

said first tire having a first internal space and a first pressure in said first internal space;

said second tire having a second internal space and a second pressure in said second internal space;

means for transferring a fluid between said first and second internal spaces;

said means for transferring including a valve having a first closed position, an open position, and a second closed position;

said first and second closed positions being effective to prevent a flow of said fluid between said first and said second internal spaces;

said open position being effective to allow a flow of said fluid between said first and said second internal spaces;

means for placing said valve in said first closed position when a difference between said first pressure and said second pressure falls below a first differential pressure;

means for placing said valve in said open position when said difference is greater than said first differential pressure;

means for placing said valve in said second closed position when said difference is greater than a second differential pressure; and said second differential pressure being greater than said first differential pressure.

2. A combination of multiple tires as in claim 1, further comprising means for manually disconnecting said valve from a one of said first and said second tires, thereby preventing a flow of said fluid between said first and said second tires.

3. A combination of multiple tires as in claim 1, in which:

a plurality of lamps are disposed on an outer side of said single wheel; and at least one of said plurality of lamps is responsive to an opening of said valve.

4. A combination as in claim 1, wherein said valve includes:

a housing;

a valve body slidably encased in said housing;

a pair of springs in said housing;

said valve body being held in a central location in said housing by said pair of springs, each of said pair of springs being compressed on opposite sides of said valve body;

said valve body having tapered grooves; and an internal configuration of said housing being effective to permit said fluid to travel through at least one of said grooves when said valve body is shifted from said central position and to prevent said fluid from travelling through said at least one of said grooves when said valve body is in said central position.

5. A combination as in claim 4, wherein said valve body and said housing are configured to permit said first and said second pressures to act oppositely on a position of said valve body.

6. A combination of multiple tires comprising:

a first and a second tire disposed adjacently parallel to each other on a single wheel;

said first tire having a first internal space and a first pressure in said first internal space;

said second tire having a second internal space and a second pressure in said second internal space;

means for transferring a fluid between said first and said second internal spaces;

said means for transferring including a valve having a first closed position, a plurality of open positions, and a second closed position;

said first and said second closed positions being effective to prevent a flow of said fluid between said first and said second internal spaces;

said plurality of open positions being effective to allow a flow of said fluid between said first and said second internal spaces;

means for placing said valve in said first closed position when a difference between said first pressure and said second pressure falls below a first differential pressure;

means for placing said valve in a first of said plurality when said difference is greater than said first differential pressure;

means for placing said valve in a second of said plurality when said difference is greater than a second differential pressure;

said second differential pressure being higher than said first differential pressure;

said second of said plurality being effective to permit a higher rate of flow than said first of said plurality, for a given differential pressure between said first and said second internal spaces;

means for placing said valve in said second closed position when said difference between said first pressure and said second pressure is greater than a third differential pressure; and said third differential pressure being greater than said second differential pressure.

7. A combination of multiple tires as in claim 6, further comprising means for manually disconnecting said valve from a one of said first and said second tires, thereby preventing a flow of air between said first and said second tires.

8. A combination of multiple tires as in claim 6, in which:

a plurality of lamps are disposed on an outer side of said single wheel; and at least one of said plurality of lamps is responsive to an opening of said valve.

9. A combination as in claim 6, wherein said valve includes:

a housing;

a valve body slidably encased in said housing;

a pair of springs in said housing;

said valve body being held in a central location in said housing by said pair of springs, each of said pair of springs being compressed on opposite sides of said valve body;

said valve body having tapered grooves; and an internal configuration of said housing being effective to permit said fluid to travel through at least one of said grooves when said valve body is shifted from said central position and to prevent said fluid from travelling through said at least one when said valve body is in said central position.

10. A combination as in claim 9, wherein said valve body and said housing are configured to permit said first and said second pressures to act oppositely on a position of said valve body.

* * * * *